United States Patent
Gesenhues et al.

[11] Patent Number: 5,308,290
[45] Date of Patent: May 3, 1994

[54] BELT PULLEY

[75] Inventors: Bernhard Gesenhues, Birkenau; Roger Weinlein, Viernheim, both of Fed. Rep. of Germany

[73] Assignee: Firma Carl Freudenberg, Weinheim, Fed. Rep. of Germany

[21] Appl. No.: 40,164

[22] Filed: Mar. 30, 1993

[30] Foreign Application Priority Data

Mar. 30, 1992 [DE] Fed. Rep. of Germany ....... 4210345

[51] Int. Cl.⁵ .................................................. F16H 7/00
[52] U.S. Cl. .................................. 474/152; 474/166; 474/902
[58] Field of Search ............... 474/152, 153, 161, 166, 474/167, 190, 191, 902, 903

[56] References Cited

U.S. PATENT DOCUMENTS

| | | | |
|---|---|---|---|
| 536,813 | 4/1895 | MacPhail et al. | 474/152 |
| 2,887,891 | 5/1959 | Perez | 474/902 X |
| 3,807,247 | 4/1974 | Shiina | 474/153 |
| 4,416,650 | 11/1983 | Wilkins | 474/903 X |
| 4,632,153 | 12/1986 | Heller et al. | 474/152 X |
| 5,222,919 | 6/1993 | Stauder | 474/166 |

Primary Examiner—Thuy M. Bui
Attorney, Agent, or Firm—Kenyon & Kenyon

[57] ABSTRACT

A belt pulley is described which includes a pulley member and a flanged wheel. The pulley member has a belt-bearing surface and a projection disposed at a position axially adjacent to the belt-bearing surface. The flanged wheel is capable of being assembled separately on the pulley member and includes a spring washer having an inside diameter and an outside diameter. The spring washer is substantially elastically extendable in the area of the inside diameter. The dimensions of the inside diameter are defined such that, upon assembly, the inside diameter elastically extends and touches upon a surface of the projection over at least a portion of the inside diameter such that the flanged wheel is mounted concentrically and non-rotatably in relation to the belt-bearing surface. The inner and outer diameters of the spring washer are defined such that, upon assembly, the flanged wheel projects outwardly in a radial direction beyond the belt-bearing surface, thereby delimiting the belt-bearing surface in the axial direction.

14 Claims, 3 Drawing Sheets

BELT PULLEY

BACKGROUND OF THE INVENTION

The invention relates generally to belt pulleys and, more particularly, to belt pulleys having at least one pulley member with a belt-bearing surface that is delimited in the axial direction by at least one separately assembled flanged wheel. The separately assembled flanged wheel projects outwardly from the belt-bearing surface in a radial direction and is mounted concentrically and non-rotatably in relation to the belt-bearing surface such that it is movable, together with the belt-bearing surface, around an axis of rotation.

Belt pulleys of this general type are known and are used, for example, to drive accessory machine units in the field of internal combustion engines. The generally known separately assembled flanged wheels are not very desirable from a production engineering standpoint, because such flanged wheels typically must be screwed or shrunk onto the belt pulley member during installation.

An object of this invention is to further develop a belt pulley of the above-mentioned type which would make use of a separately assembled flanged wheel, which can easily and cost-effectively be produced and which considerably simplifies assembly.

SUMMARY OF THE INVENTION

The invention addresses this need by providing a belt pulley having a flanged wheel that is mounted on a projection that is axially adjacent to a belt-bearing surface. The projection is integrally formed in a single piece with the pulley member, and the flanged wheel is in the form of a spring washer, which is elastically widened in the region of its inside diameter and which contacts at least a portion of the circumference of the projection.

According to an embodiment of the invention, a belt pulley is provided which comprises a pulley member and a flanged wheel. The pulley member includes a belt-bearing surface and a projection disposed at a position axially adjacent to the belt-bearing surface. The flanged wheel is capable of being assembled separately on the pulley member and includes a spring washer having an inside diameter and an outside diameter. The spring washer is substantially elastically extendable in the area of the inside diameter. The dimensions of the inside diameter are defined such that, upon assembly, the inside diameter elastically extends and touches upon a surface of the projection over at least a portion of the inside diameter such that the flanged wheel is mounted concentrically and non-rotatably in relation to the belt-bearing surface. The inner and outer diameters of the spring washer are defined such that, upon assembly, the flanged wheel projects outwardly in a radial direction beyond the belt-bearing surface, thereby delimiting the belt-bearing surface in the axial direction.

One advantage of the invention is that the spring action of the elastically widened spring washer enables one to easily assemble the flanged wheel. A permanent composite construction is created simply by pressing the flanged wheel onto the projection of the belt pulley member. This simple construction assures good working properties for the belt pulley over a long service life.

Depending upon the conditions of the particular application at hand, according to an embodiment of the invention, the spring washer can be provided such that the inside diameter of the spring washer continuously contacts the projection along an essentially circular peripheral line. A spring washer designed in accordance with this embodiment can be produced quite inexpensively.

According to another embodiment of the invention, a spring washer can be provided with flexible tabs that are distributed along the inside circumference of the spring washer for contact with the projection. Advantages of this embodiment include a comparatively small inertial mass for the spring washer, and the ability to compensate for manufacturing tolerances of the spring washer itself and of the projection. The working properties of such a belt pulley are excellent.

For most embodiments, radially directed prestressing is sufficient to lock the spring washer place, preventing circumferential rotation of the spring washer on the projection of the belt pulley. Another measure, comprising arranging flexible tabs in axially running grooves along the projection, can provide additional means for locking the spring washer in place. In such an embodiment, the flexible tabs contact the base of the groove and, in this manner, prevent the spring washer from being axially displaced. Moreover, by situating the tabs in the grooves, the spring washer and the belt pulley member are also prevented from rotating relative to one another in the circumferential direction.

In one embodiment, the spring washer is advantageously made of a metallic material, and essentially U-shaped perforations are uniformly distributed along its inside diameter in the direction of the projection. This embodiment makes it possible t reduce or even to avoid notch stresses. This embodiment also prevents hairline cracks from forming in the area of the radial transition zone between the flexible tabs and the stop faces of the flexible tabs during normal operational use of the belt pulley.

In the above embodiment, there are preferably at least three flexible tabs and perforations. Depending upon the size of the belt pulley, the number of flexible tabs/perforations should be selected to securely attach the flanged wheel on the belt pulley member, while at the same time ensuring the simplest possible production and assembly of the flanged wheel. The number of flexible tabs and perforations will also depend upon the size of the belt pulley.

Depending upon the particular application at hand, the radial depth of the perforations can, for example, be 0.01 to 0.5 times as great as the radial thickness of the flanged wheel. Advantageous radial depths of 1 mm to 10 mm, for example, are common. Optimization of the flexible tabs/perforations influences the radial prestressing of the flexible tabs, which are braced against the projection along an essentially circular peripheral line.

According to another embodiment, the flexible tabs formed by the perforations can be axially bent in a direction opposed to the direction of assembly (which extends parallel to the axis of rotation) such that the flexible tabs form an angle of 45° to 89°, preferably of 65° to 85°, with respect to the axis of rotation. The radial spring action of the flexible tabs in the direction of the projection produces a barb-like interaction between these two elements. When the flanged wheel is pressed on the projection, the interaction between the flexible tabs and the projection forces the flexible tabs to elastically expand in a radially outward direction. Once the press-on operation is ended, and the flanged wheel forms the axial boundary edge of the belt-bearing surface, and a barb-like mechanical interaction is produced between the flexible tabs and the projection of the belt pulley member. This prevents the flanged wheel from moving in an axial direction contrary to the direction of assembly during normal operational use.

One advantageous embodiment provides for the belt pulley member to be made of a polymeric material. Because the material of the belt pulley member and, thus, of the projection is comparatively softer than the material of the flexible tabs (which are made, for example, of hardened spring steel), the barb-like interaction between the flanged wheel and the projection on the belt pulley member is further enhanced.

According to another embodiment, the belt pulley member can consist of metallic material. In such a case, however, it is desirable that a circumferential grooved indentation be provided on the projection of the pulley member so that, when the flanged wheel is installed, the flexible tabs are able to be snapped into the grooved indentation to brace them against an axial displacement. However, belt pulley members consisting of a polymer material have the advantages of being cheaper to produce and having smaller inertial mass.

According to another embodiment, assembly of the flanged wheel can be further simplified if the outside diameter of the projection is offset in relation to the outside diameter of the belt-bearing surface. This offset provides a stop face for the spring washer, so that an unvarying predetermined axial width is guaranteed in a simple fashion for the belt-bearing surface, facilitating mass production of the component.

To be able to slide the spring washer in the direction of assembly with particular ease and in a concentric fashion onto the projection of the pulley member, according to another embodiment, the projection is chamfered in the axial direction on the side of the projection facing away from the belt-bearing surface. The chamfer forms an angle, for example, of 5° to 35° with respect to the axis of rotation.

BRIEF DESCRIPTION OF THE DRAWINGS

These and other features, aspects, and advantages of the present invention will become better understood with regard to the following description, appended claims, and accompanying drawings, where:

DETAILED DESCRIPTION

Figure 1:
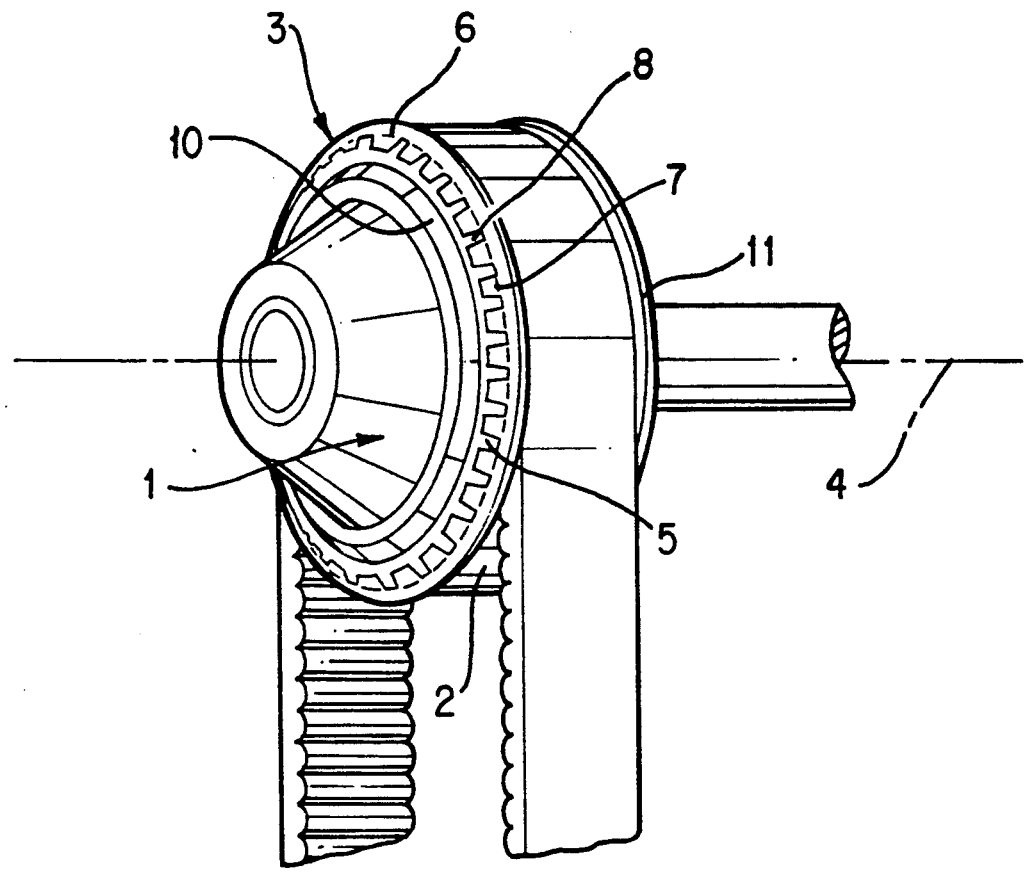
FIG. 1 is a perspective view of the belt pulley according to an embodiment of the present invention.

FIG. 1 shows a belt pulley, according to an embodiment of the invention, comprising a pulley member 1 of polymer material with a premolded flanged wheel 11 premolded in one piece on the pulley member 1 in the axial direction. A belt-bearing surface 2 is provided between the premolded flanged wheel 11 and a separately assembled flanged wheel 3, which is capable of being assembled separately. The premolded flanged wheel and the separately assembled flanged wheel 3 project outwardly in the radial direction from the belt-bearing surface 2 and the belt (not numbered) resting on it, thus preventing axial displacement of the belt during normal operational use. The separately assembled flanged wheel 3 is mounted on a projection 5, which is axially adjacent to the belt-bearing surface 2. The projection 5 is integrally formed with the pulley member 1 and consists, in this exemplified embodiment, of a polymer material.

Figure 2B:
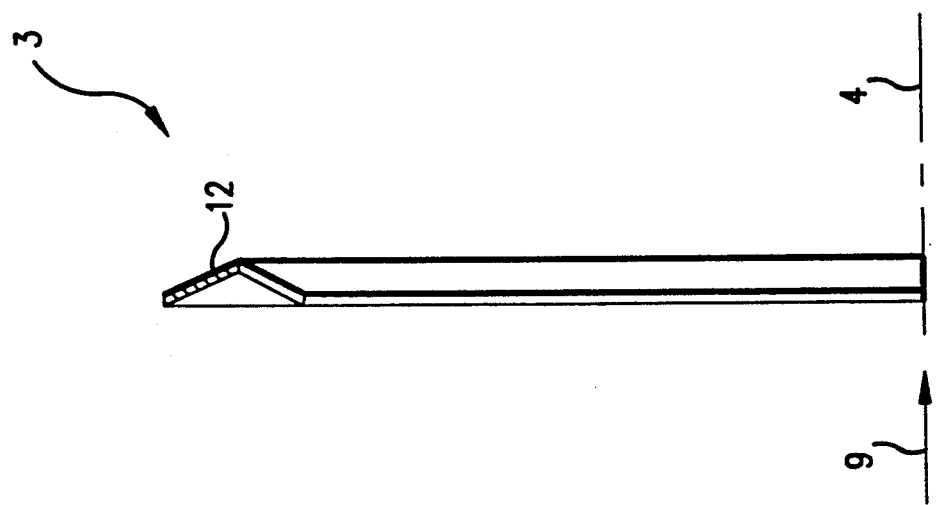
FIG. 2B is a sectional view taken along line 2B of the embodiment shown in FIG. 2A.
Figure 2A:
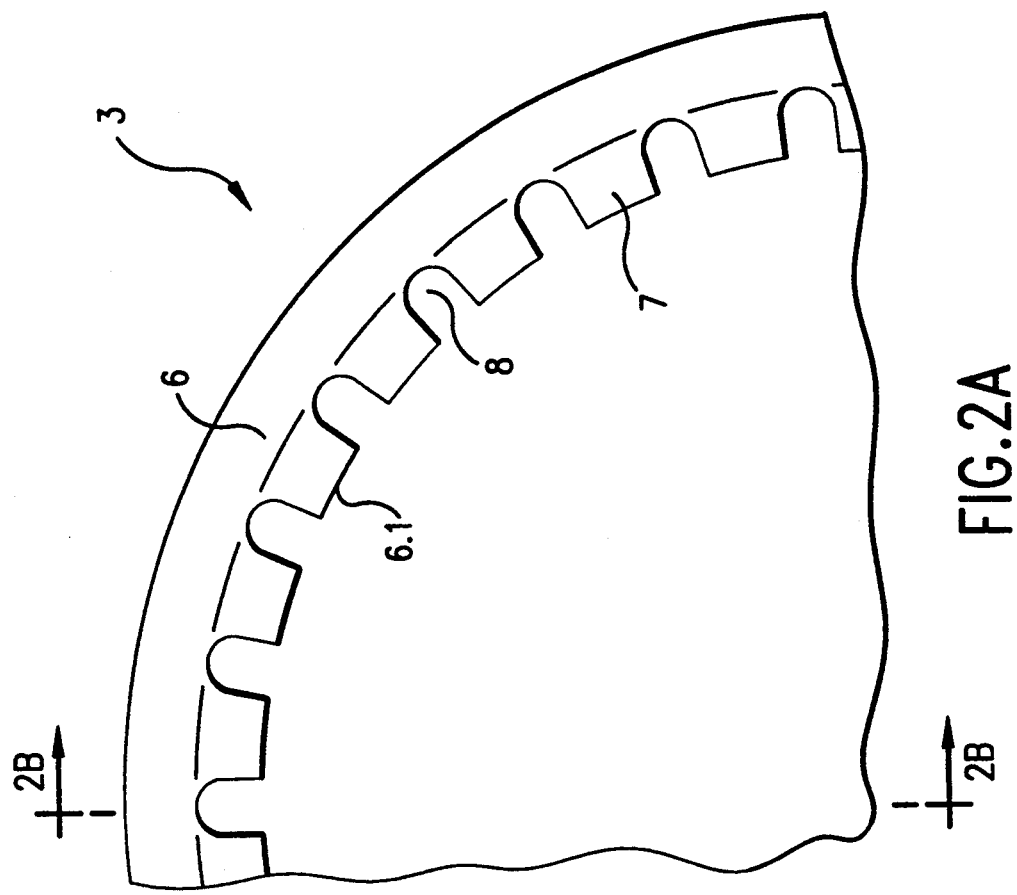
FIG. 2A is a partial plan view of a flanged wheel in the form of spring washer according to an embodiment of the present invention.

FIGS. 2A and 2B depict an embodiment of a separately assembled flanged wheel 3 in the form of a spring washer 6 on an enlarged scale. In the area of its inside diameter 6.1, the spring washer 6 has flexible tabs 7, which are separated by perforations 8 and which are axially crimped contrary to the direction of assembly 9 and which form an angle of about 10° to 20° with respect to an imaginary radial plane. The abutment surface 12 of the spring washer 6 which abuts the belt to be used forms an angle of about 15° with respect to the radial plane in this example, such that the abutment surface 12 tapers away from the belt with increasing radial distance from the belt-bearing surface 2.

Referring now to FIGS. 1 and 2A, the separately assembled flanged wheel 3 is provided in the form of a spring washer 6, which can be elastically extended in the area of its inside diameter 6.1 and which contacts the projection 5 with flexible tabs 7 that are uniformly distributed in the circumferential direction with radial prestressing. The flexible tabs 7 are axially crimped in a direction contrary to the direction of assembly 9 and, in this exemplified embodiment, form an angle of about 70° to 80° with respect to the axis of rotation 4. The inside diameter 6.1 of the spring washer 6 is manufactured such that the inside diameter 6.1 is smaller than the outside diameter of the projection 5. As a result of this arrangement, after the spring washer 6 is installed on the projection 5, the flexible tabs 7 mechanically claw into the surface of the projection 5.

The spring washer 6 can be produced quite easily and inexpensively in large piece numbers, and it forms a secure axial boundary edge for the belt on the belt-bearing surface 2 due to the barb-like effect of the flexible tabs 7 upon the projection 5.

The assembly operation is carried out by simply pressing the spring washer 6 in an axial direction 9 onto the projection 5. The spring washer 6 is pressed in the axial direction over the surface of the projection 5, until it is positioned against an offset, which corresponds to an axial boundary of the belt-bearing surface 2. As a result, the assembly operation is quite simple.

Moreover, the projection 5 is chamfered in the axial direction on the side of the projection 5 facing away from the belt-bearing surface 2. The chamfer 10 forms an angle of about 5° to 35° with respect to the axis of rotation 4 and facilitates the pressing of the spring washer 6 in the direction of assembly 9 onto the projection 5.

Figure 3:
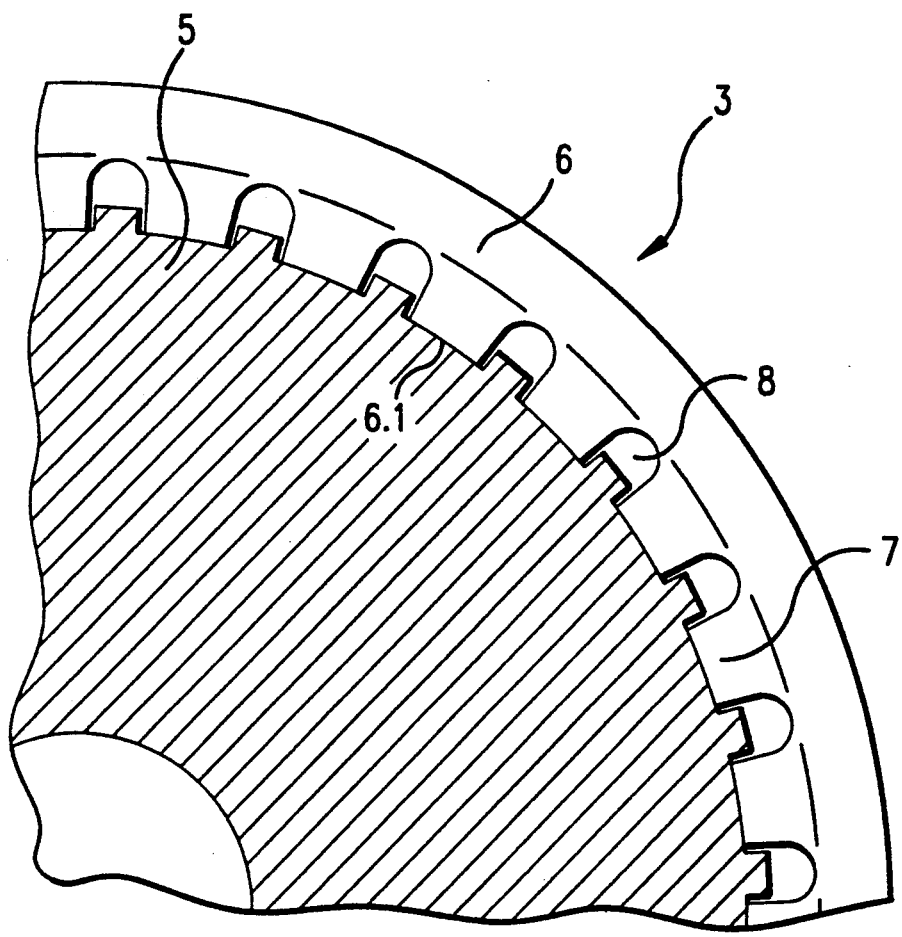
FIG. 3 is a plan view of a spring washer, which is locked against rotation in the circumferential direction by a projection provided with axial grooves according to an embodiment of the present invention.

FIG. 3 depicts an exemplified embodiment of a spring washer 6 that has flexible tabs 7 uniformly distributed along its inside diameter 6.1 of the spring washer 6. The flexible tabs 7 are guided in grooves, which extend in the axial direction along the projection 5, locking the spring washer 6 against axial rotation with respect to the projection 5. In the area of the inner diameter 6.1, the flexible tabs 7 extend, with radial prestressing, to the bottom of the grooves, contacting the projection 5. This provides an excellent protection for the spring washer 6, preventing it from being axially displaced and from rotating on the projection 5.

What is claimed is:

1. A belt pulley assembly comprising:
   a pulley member comprising a belt-bearing surface and a projection disposed at a position axially adjacent to said belt-bearing surface; and
   a flanged wheel that is capable of being assembled separately on said pulley member, said flanged wheel comprising a spring washer having an inside diameter and an outside diameter, said spring washer being substantially elastically extendable only in said area of said inside diameter, the dimensions of said inside diameter defined such that, upon assembly, said inside diameter elastically extends and touches upon a surface of said projection over at least a portion of said inside diameter in a manner whereby said flanged wheel is mounted concentrically and non-rotatably in relation to said belt-bearing surface, said inner diameter and said outer diameter of said spring washer defined such that, upon assembly, said flanged wheel projects outwardly in a radial direction beyond said belt-bearing surface, thereby delimiting said belt-bearing surface in an axial direction.

2. The belt pulley assembly according to claim 1, wherein said inside diameter of said spring washer continuously touches upon said projection along an essentially circular peripheral line.

3. The belt pulley assembly according to claim 1, wherein said spring washer further comprises a plurality of flexible tabs separated by perforations, said flexible tabs and perforations being distributed along said inside diameter of said spring washer in a circumferential direction such that said flexible tabs touch upon said surface of said projection upon assembly.

4. The belt pulley assembly according to claim 3, wherein a plurality of axially disposed grooves are defined in said surface of said projection such that said flexible tabs are arranged in said axially disposed grooves of said projection upon assembly.

5. The belt pulley assembly according to claim 3, wherein said spring washer is made of a metallic material and wherein said perforations are essentially U-shaped.

6. The belt pulley assembly according to claim 3, wherein there are at least three flexible tabs and at least three perforations.

7. The belt pulley assembly according to claim 3, wherein said radial depth of said perforations is 0.01 to 0.5 times as great as said radial thickness of said flanged wheel.

8. The belt pulley assembly according to claim 7, wherein said radial depth of said perforations is 1 mm to 10 mm.

9. The belt pulley assembly according to claim 3, wherein said flexible tabs are axially bent in a direction contrary to a direction of assembly extending parallel to an axis of rotation of said belt pulley, such that said flexible tabs form an angle of 45° to 89° with respect to said axis of rotation.

10. The belt pulley assembly according to claim 9, wherein said angle is 65° to 85°.

11. The belt pulley assembly according to claim 1, wherein said belt pulley member is made of a polymer material.

12. The belt pulley assembly according to claim 1, wherein said belt-bearing surface has a radial dimension that is greater than a radial dimension of said projection adjacent to said belt-bearing surface.

13. The belt pulley assembly according to claim 12, wherein a portion of said projection is chamfered in the axial direction facing away from said belt-bearing surface, and said chamfer forms an angle of 5° to 35° with respect to an axis of rotation of said belt pulley.

14. A belt pulley comprising:
   at least one pulley member having a belt-bearing surface and having a projection that is axially adjacent to said belt-bearing surface, said belt-bearing surface and said projection being formed in one piece with said pulley member; and
   at least one flanged wheel that is assembled onto said projection of pulley member such that the belt-bearing surface is delimited in the axial direction by said flanged wheel, such that said flanged wheel is mounted concentrically and non-rotatably in relation to said belt-bearing surface, and such that said flanged wheel is movable, together with the belt-bearing surface, around an axis of rotation, said flanged wheel being formed from a spring washer which is elastically widened only in the area of its inside diameter such that said spring washer touches upon said projection with an at least partial fit in the circumferential direction and such that said flanged wheel radially projects beyond said belt-bearing surface.

* * * * *

UNITED STATES PATENT AND TRADEMARK OFFICE
CERTIFICATE OF CORRECTION

PATENT NO. : 5,308,290
DATED : May 3, 1994
INVENTOR(S) : GESENHUES, et al.

It is certified that error appears in the above-indentified patent and that said Letters Patent is hereby corrected as shown below:

In Column 2, line 32, change "t" to

-- to --.

In Column 3, line 68, change "wheel" to

-- wheel 11 --.

Signed and Sealed this

First Day of November, 1994

Attest:

Attesting Officer

BRUCE LEHMAN
Commissioner of Patents and Trademarks